June 19, 1945.   F. W. COFFING   2,378,835
MOTOR VEHICLE AND JACK LIFTING CONNECTION
Filed Sept. 16, 1943
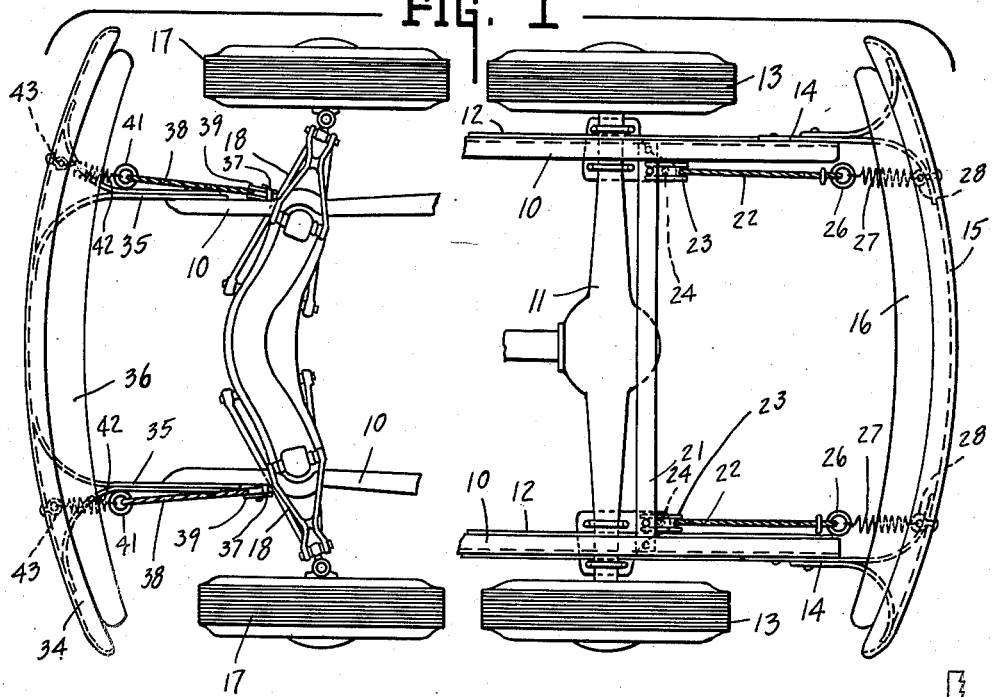
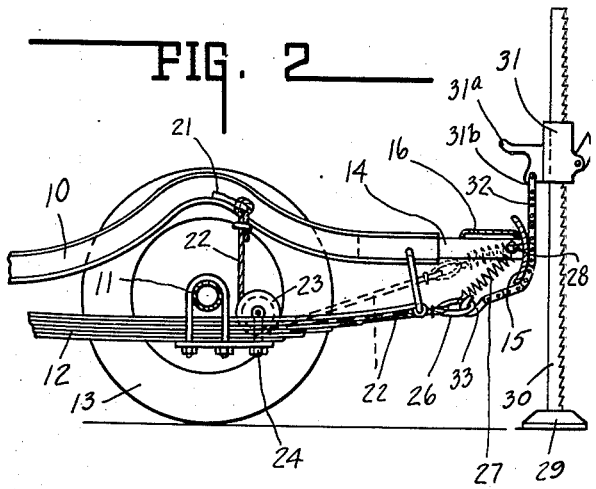
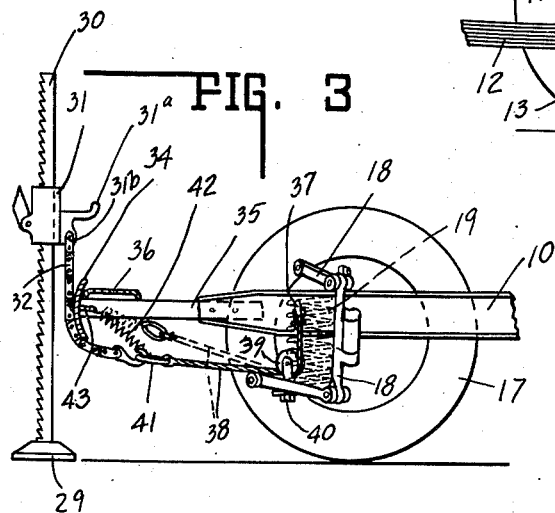
INVENTOR.
FREDRICK W. COFFING,
BY Lockwood, Goldsmith & Galt.
ATTORNEYS.

Patented June 19, 1945

2,378,835

UNITED STATES PATENT OFFICE 2,378,835

MOTOR VEHICLE AND JACK LIFTING CONNECTION

Fredrick W. Coffing, Danville, Ill.

Application September 16, 1943, Serial No. 502,551

6 Claims. (Cl. 254—133)

This invention relates to a jack structure for motor vehicles.

For automobiles and the like, it is well known that same include a frame, front and rear wheels and springs, etc., connecting the axles, etc., to the frame, this being termed the chassis. Almost invariably same now includes front and rear bumpers having arms secured to the frame. Some bumpers have the space between the front fenders, grill, etc., and the space between the rear fenders, body back, etc., closed by shields, etc.

Conventional jacks, several years ago, were applied to the underside of the axle for raising same and the load, so that wheels could be removed and replaced for tire exchange purposes. When cars became longer and lower and bumpers became standard equipment, bumper jacks were supplied or rigid projections from the frame projected towards the bumper for jack engagement.

Bumper jacks engaged the under face or edge of the bumper or the adjacent bumper arm if the shielded type of bumper was not employed. The frame rigid arm extension was similarly engaged at its outer end by the jack.

Either practice, however, resulted in initial jack operation removing the vehicle weight from the spring supported by the axle, permitting the spring to extend, etc., until the permissible limit thereof was attained whereupon further jack operation then simultaneously elevated the load, frame and axle, etc.

It will be apparent the earliest practice required less elevation for wheel changing purposes, since the spring connection to the wheel support was always under load. Car elongation, etc., and bumper additions made this initial type of elevation practically impossible.

The chief object of the present invention is to retain the advantage of low lift with a jack associated with or adjacent to a bumper.

The chief feature of the present invention is to provide an addition to a vehicle adjacent each wheel which will not interfere with the normal operation of the wheel, or that of its supported spring structure, but which addition can be readily connected, when desired, to a jack adjacent the bumper for simultaneously elevating the wheel while holding under load its spring as it were. In other words, this invention retains the original spring compression due to load and during the elevation of the wheel and while elevated.

The problem solved by this invention has become increasingly difficult with knee action and this invention is directed to a satisfactory solution.

Other objects and features of the invention will be set forth more fully hereinafter.

The full nature of the invention will be understood from the accompanying drawing and the following description and claims:

In the drawing

Fig. 1 is a top plan view of a conventional frame equipped with bumpers, intermediate shields, and supported by the vehicle wheels and intermediate spring structures and the permanent vehicle connected portions of the invention applied thereto.

Fig. 2 is a side elevation of a rear wheel, etc., with jack applied for wheel raising purposes, the entire invention being herein illustrated.

Fig. 3 is a side elevation of a front wheel, etc., with jack applied for wheel raising purposes, the entire invention being herein illustrated.

In Fig. 1 of the drawing 10 indicates a conventional motor vehicle frame. The rear axle structure 11 supports the spring structures 12 in turn supported by the rear and driving wheels 13. Rigid with the frame 10 are the rearwardly extending bumper supporting arms 14 carrying the rear bumper 15 and associated therewith may be the intervening shield portion 16 as shown. The front and steering wheels 17 carry the knee action structure 18 including springs 19.

Secured to the frame adjacent each wheel and to the adjacent bumper is a permanent installation. This is illustrated in Fig. 2 as applied to a rear wheel arrangement and includes a frame anchorage 21, a metal cable 22 passing under a pulley 23 carried as at 24 by the axle 11 or by spring 12 adjacent thereto. The cable 22 extends toward the adjacent bumper 15 and terminates in a ring 26. This ring has secured to it one end of a spring 27, the other end thereof being secured at 28 to the interior of the bumper or to the arm of same when connected thereto.

This spring 27 is always under tension and hence cable 22 is never slack. This arrangement is such that the relative movement of the wheel toward and away from the body is not in any way interfered with. However, when snubbing action is desired, the spring 27 may be of such character, that is size, strength, etc., that it can upon extreme extension, incident to the wheel dropping into a deep hole, or the body bouncing to an undue elevation, check and snub such action. The present invention, accordingly, has the aforesaid additional snubbing action advantage when desired.

As previously described, one of these units is provided adjacent each vehicle wheel and same constitutes a permanent addition to the vehicle. A jack structure is selectively associated with said permanently attached structures.

This jack structure may take any conventional form, that herein disclosed including a bearing plate 29, a standard 30 of rack bar or screw thread type and an elevating and lowering member 31 thereon, lever or like operable to raise or lower member 31. A jack as thus described is conventional and usually includes a projecting arm 31a to engage the under face of the bumper or bumper supporting arm.

Herein, however, arm 31a, if desired, may be omitted. This member 31 has permanently secured to it at 31b the cable or chain 32 which is of the desired or required length. The other end of said cable has secured to it a hook 33 adapted for attachable connection to ring 26.

When so connected and member 31 is raised upon standard 30, the initial elevation of member 31 takes up the slack in cable or chain 32, establishing continuous tension means between the jack lifting element 31 and the cable interconnected between the frame and axle members. Then cable 32 engages the under face of the rear bumper 15 and continued elevation of member 31 then simultaneously holds the vehicle spring 12 compressed, equivalent to being under load, and hence elevates both the body and frame and the wheel axle. When sufficiently elevated wheel replacement is effected, member 31 then is lowered, cable hook 33 is detached from ring 26 and the operation is completed. Spring 27 thereupon restores cable 22 to its normal or conventional tensioned position.

In Fig. 3 a front wheel 17 is carried by knee action 18 including spring 19. Front bumper 34 is supported by arms 35 carried by the frame 10. Shield 36 may be included if desired.

In this figure it will be observed that the permanently attached portion of the invention is similarly designed and similarly mounted and associated therewith is a similarly designated jack structure as illustrated in Fig. 2.

Herein at 37 a cable 38 is attached to frame 10. Said cable passes through pulley 39 secured as at 40 to the lower portion of the knee action 18. Cable 38 terminates in the ring 41 connected by spring 42 to bumper 34 as at 43 or to the arm 35 if desired. The jack structure shown in Fig. 2 is utilized herein in Fig. 3, as shown in Fig. 2.

The operation for raising and lowering the knee action 18 and wheel 17 for wheel replacement is effected as previously described. It will be noted that the permanently attached portions of the invention are so attached that they do not interfere with the knee action, etc., or the steering action of said front wheels 17. When desired, of course, the spring 42 of the vehicle permanently attached portion of the invention may be sufficiently strong for the purposes previously described.

From the foregoing it will be noted that each permanent installation includes a cable, a spring, a ring, a pulley or its equivalent, a pulley anchorage and a cable anchorage. The cost of such permanent installation is extremely inexpensive per vehicle as compared to other devices attempting to solve the same problem.

What is not so obvious from the foregoing, unless attention is called thereto, is that to connect the ring and hook only requires the operator to hand pass the hook under the bumper and laterally into ring engagement. The reverse operation effects disconnection. Only raising and lowering of member 31, thereafter is required for raising and lowering of the wheel, and as stated, this is only an amount necessary to raise with the spring compressed or in load position the wheel after the jack chain is tautened.

It also will be apparent that any standard bumper jack (now conventional) need only have applied thereto a comparatively short length of flexible chain or cable of inextensible character and terminating in a hook.

Many of the previous attempts to solve this problem have been defeated because of clearance requirements. With the present invention, even if the bumper is mired, a channel can be scooped thereunder to provide hook access to the ring and when the ring is connected the desired elevation can be effected with no other jack setting.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. Lifting means for vehicles having a rectangular frame member including a side and an end portion, an axle member, and springs operatively connected between said frame member and axle member; a flexible non-extensible cable connected at one end to one of said members and extending towards and operatively engaged with said other member, said cable having its opposite end portion extending toward and terminating inwardly of said end portion of said frame, a removable jack beyond said frame end portion, a lifting member forming a part of said jack disposed above the plane of the lowermost part of said frame end portion, a flexible element connected to and depending from said lifting member outside of the said frame end portion, and readily releasable means for connecting said flexible element to said opposite end of the cable beneath said frame end whereby the flexible element is brought into operative engagement with said frame end portion and under lifting stress therewith when the lifting member is raised.

2. Lifting means for vehicles having a rectangular frame member including a side and an end portion, an axle member, and springs operatively connected between said frame member and axle member; a flexible non-extensible cable connected at one end to one of said members and extending towards and operatively engaged with said other member, said cable having its opposite end portion extending toward and terminating adjacent to said end portion of said frame, a removable jack, a lifting member forming a part of said jack disposed above the plane of and beyond said frame end portion, a flexible element connected to and depending from said lifting member, and readily releasable means for connecting the lower end of said flexible element to said opposite end of the cable; the cable and flexible element when operatively connected together and under lifting stress of said jack constituting a continuous tension lifting means operating upon the lower edge of said end frame member to elevate said vehicle, and maintaining said frame member and said axle member against separating movement.

3. Lifting means for vehicles having a rectangular frame member including a side and an end portion, an axle member, and springs operatively connected between said frame member and axle member; a flexible non-extensible cable connected at one end to one of said members and extending towards and operatively engaged with said other member, said cable having its opposite end portion extending toward and terminating inwardly of said end portion of said frame, a spring connecting said cable end yieldably with said frame end portion, a removable jack beyond said frame end portion, a lifting member forming a part of said jack disposed above the plane of the lowermost part of said frame end portion, a flexible element connected to and depending from said lifting member outside of the said frame end portion, and a hook on the lower end of said flexible element for engagement with said opposite end of the cable beneath said frame end, whereby the flexible element is brought into operative engagement with said frame end portion and under lifting stress therewith when the lifting member is raised.

4. Lifting means for vehicles having a rectangular frame member including a side and an end portion, an axle member, and springs operatively connected between said frame member and axle member; a flexible non-extensible cable connected at one end to one of said members and extending towards and operatively engaged with said other member, said cable having its opposite end portion extending toward and terminating inwardly of said end portion of said frame, a ring secured to said cable end, a spring yieldably connecting said ring with said frame end portion, a removable jack beyond said frame end portion, a lifting member forming a part of said jack disposed above the plane of the lowermost part of said frame end portion, a flexible element connected to and depending from said lifting member outside of said frame end portion, and a hook on the lower end of said flexible element for engagement with said ring beneath said frame end, whereby the flexible element is brought into operative engagement with said frame end portion and under lifting stress therewith when the lifting member is raised.

5. Lifting means for vehicles having a rectangular frame member including a side and an end portion, an axle member, and springs operatively connected between said frame member and axle member; a flexible non-extensible cable connected at one end to one of said members and extending towards and operatively engaged with the other member, said cable having its opposite end portion extending toward and terminating adjacent to said end portion of said frame, a removable jack disposed beyond said frame end portion, a lifting member forming a part of said jack disposed above the plane of the lowermost part of said frame end portion, a flexible element connected to and depending from said lifting member outside of said frame end portion, and means for connecting said flexible element to said opposite end of the cable; the cable and flexible element when operatively connected together and under lifting stress of said jack constituting a continuous tension lifting means operating upon said end frame member to elevate said vehicle.

6. Lifting means for vehicles having a rectangular frame member including a side and an end portion, an axle member, and springs operatively connected between said frame and axle members; comprising means interposed between said frame and axle members when under tension to maintain said members against separating and including a flexible non-extensible cable having one end terminating adjacent to said frame end member, a removable jack beyond said frame end portion, a lifting member forming a part of said jack disposed above the plane of the lowermost part of said frame end portion, a flexible element connected to and depending from said lifting member outside of the frame end portion, and releasable means for connecting the lower end of said flexible element to said cable end; the cable and flexible element when operatively connected together and under lifting stress of said jack constituting a continuous tension means between said frame member and said axle member to hold the same against separating movement and simultaneously acting upon the lower edge of said end portion to elevate said vehicle.

FREDRICK W. COFFING.